(12) United States Patent
Lange

(10) Patent No.: US 8,795,404 B2
(45) Date of Patent: Aug. 5, 2014

(54) SEALED EDGE FRAME

(75) Inventor: Michael Lange, Feinled (DE)

(73) Assignee: Camfil AB, Trosa (SE)

( * ) Notice: Subject to any disclaimer, the term of this patent is extended or adjusted under 35 U.S.C. 154(b) by 610 days.

(21) Appl. No.: 13/141,664

(22) PCT Filed: Dec. 15, 2008

(86) PCT No.: PCT/SE2008/051458
§ 371 (c)(1),
(2), (4) Date: Nov. 28, 2011

(87) PCT Pub. No.: WO2010/071503
PCT Pub. Date: Jun. 24, 2010

(65) Prior Publication Data
US 2012/0060455 A1   Mar. 15, 2012

(51) Int. Cl.
*B01D 46/00* (2006.01)
*B01D 46/52* (2006.01)
*B01D 46/10* (2006.01)

(52) U.S. Cl.
CPC ........ *B01D 46/521* (2013.01); *B01D 2271/022* (2013.01); *B01D 46/0005* (2013.01); *B01D 46/10* (2013.01); *B01D 2271/02* (2013.01); *Y10S 55/31* (2013.01)
USPC ............. 55/511; 55/497; 55/502; 55/DIG. 31

(58) Field of Classification Search
CPC .. B01D 46/0005; B01D 46/10; B01D 46/521; B01D 2271/022
USPC .............................. 55/497, 511, DIG. 31, 502
See application file for complete search history.

(56) References Cited

U.S. PATENT DOCUMENTS

| | | | | |
|---|---|---|---|---|
| 2,783,834 A * | 3/1957 | Brame | ......................... | 160/395 |
| 3,373,546 A * | 3/1968 | Setnan | ............. | 55/501 |
| 3,698,114 A * | 10/1972 | Hirsch et al. | ................... | 40/782 |
| 4,584,005 A * | 4/1986 | Allan et al. | ..................... | 55/499 |
| 4,963,171 A | 10/1990 | Osendorf | | |
| 5,145,500 A * | 9/1992 | Nolen, Jr. | ......................... | 55/501 |
| 6,117,202 A * | 9/2000 | Wetzel | ............. | 55/385.2 |
| 6,319,300 B1 * | 11/2001 | Chen | ............................ | 55/497 |
| 6,464,745 B2 * | 10/2002 | Rivera et al. | ................... | 55/497 |
| 8,062,403 B2 * | 11/2011 | Goode | ............................ | 55/485 |
| 8,535,404 B2 * | 9/2013 | Crabtree et al. | ............. | 55/385.6 |

(Continued)

FOREIGN PATENT DOCUMENTS

WO    WO-2006004540 A1    1/2006

OTHER PUBLICATIONS

International Application Serial No. PCT/SE2008/051458, International Search Report mailed Aug. 13, 2009, 3 pgs.

(Continued)

*Primary Examiner* — Robert Clemente
(74) *Attorney, Agent, or Firm* — Patterson & Sheridan, LLP

(57) ABSTRACT

The present invention relates to an air filter pack frame constituted of four profiled elements being held together by angle pieces and surrounding an opening there between, in which a pack of pleated filter medium is intended to be mounted, said profiled elements having a front side, which when a pack of filter medium is mounted in the frame is adjacent to an inlet side thereof, and a rear side, which when a pack of filter medium is mounted in the frame is adjacent to an outlet side thereof. According to the invention an inwardly open sealing channel extends along each profiled elements in the front end thereof.

8 Claims, 3 Drawing Sheets

(56) References Cited

U.S. PATENT DOCUMENTS

2002/0104299 A1* 8/2002 Chang .......................... 55/497
2003/0177745 A1   9/2003 Jauw

OTHER PUBLICATIONS

International Application Serial No. PCT/SE2008/051458, Written Opinion mailed Aug. 13, 2009, 6 pgs.

* cited by examiner

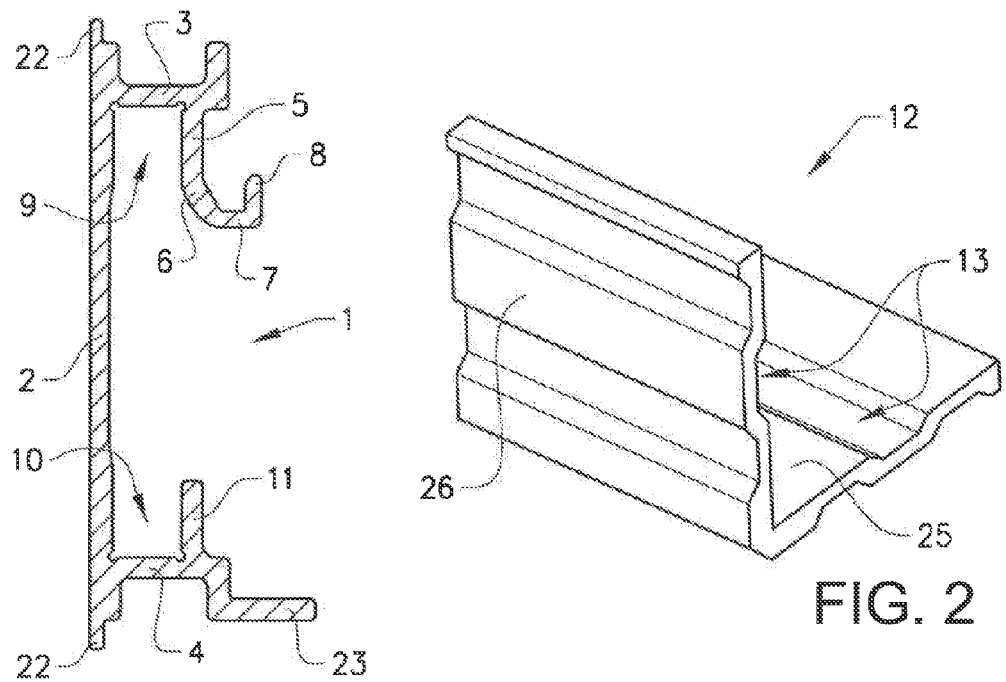
FIG. 1
FIG. 2
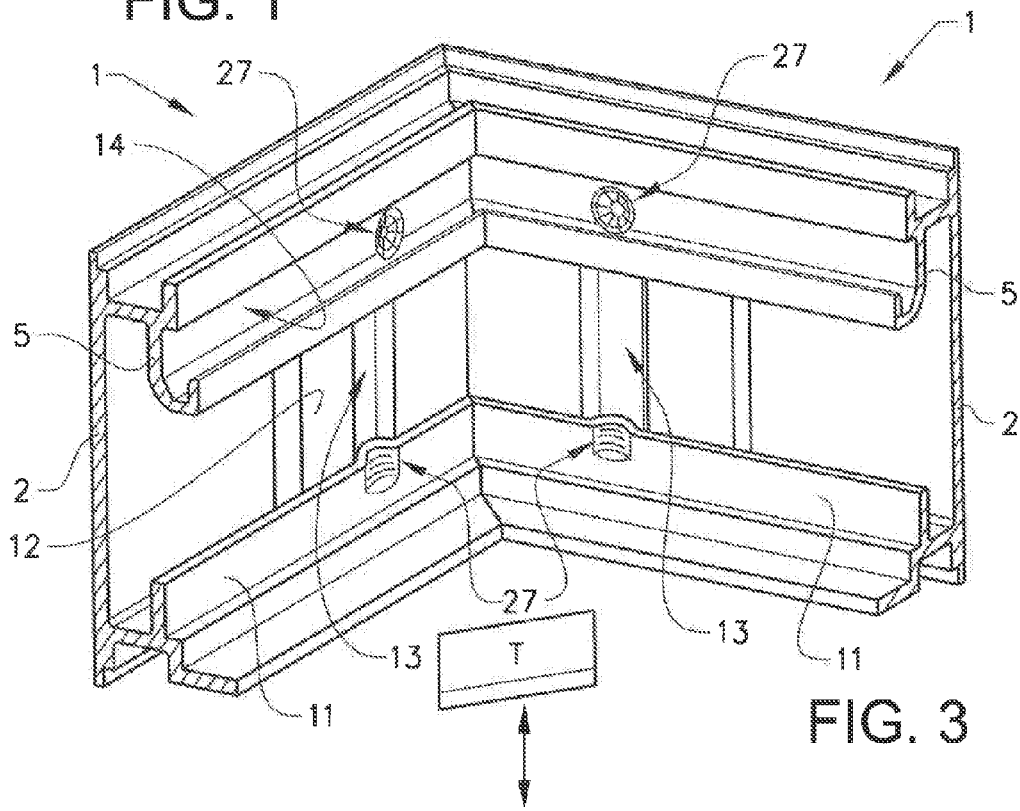
FIG. 3

SEALED EDGE FRAME

RELATED APPLICATIONS

This application is a nationalization under 35 U.S.C. 371 of PCT/SE2008/051458, filed Dec. 15, 2008 and published as WO 2010/071503 A1 on Jun. 24, 2010, which application and publication are incorporated herein by reference in their entirety.

TECHNICAL FIELD

The present invention relates to an air filter frame constituted of four profiled elements being held together by angle pieces and surrounding an opening therebetween, in which a pack of pleated filter medium is intended to be mounted, said profiled elements having a front side, which when a pack of filter medium is mounted in the frame is adjacent to an inlet side thereof, and a rear side, which when a pack of filter medium is mounted in the frame is adjacent to an outlet side thereof.

BACKGROUND OF THE INVENTION

In known air filter frames for a pack of pleated filter medium, the filter pack is sealingly held in the frame with the aid of glue. The glue extends along the four lateral sides of the filter package over the whole width of these sides in order to ensure that all air entering the filter will pass through the filter medium and not leak out at the sides thereof. The glue is applied in and is filling up an inwardly open channel in frame and functions also to increase the rigidity of the frame. Such frames consist of four elongate profile elements and in the corners of the frame are angle-irons disposed, which have tongues punched out in the material of the angle-irons. These tongues are pressed into the material of the profile elements in order to hold these together and are covered by glue after the mounting of a filter pack in the frame. The angle-irons can be fastened by a machine but the manipulation of such a machine is not easy so in many cases the tongues are instead manually applied.

The objective of the present invention is to improve frames according to the introductory paragraph so that the mounting of a filter pack therein is simplified and less glue is needed in order to ensure that all air entering the filter pack will pass therethrough. A second objective is to design the frame so that the angle pieces can more easily be locked to the profile elements by a machine.

SUMMARY OF THE INVENTION

These objectives are accomplished by an air filter frame constituted of four profiled elements being held together by angle pieces and surrounding an opening therebetween, in which a pack of pleated filter medium is intended to be mounted, said profiled elements having a front side, which when a pack of filter medium is mounted in the frame is adjacent to an inlet side thereof, and a rear side, which when a pack of filter medium is mounted in the frame is adjacent to an outlet side thereof, characterized in that an inwardly open sealing channel extends along each profiled elements in the front end thereof. Such a frame allows a very simple mounting of a filter pack comprising placing the filter pack in the frame and apply glue in said channel. Furthermore, since the channel only extends in the front end of the frame, only a small amount of glue is needed compared to a channel having a width corresponding to the thickness of the filter pack.

In a preferred embodiment, said sealing channel is defined by a channel wall including a rearwardly extended part followed by an inwardly extended part in turn followed by a forwardly extending part, the forwardly extending part having a smaller dimension than the rearwardly extending part. By such a configuration of the channel, the risk for air leakage due to shrinkage of sealant filling the channel is eliminated or at least greatly reduced.

A rear wall of each profiled element preferably extends inwardly from an outer wall of the profiled element and is extended beyond the forwardly extending part of the channel wall in an inward direction, the portion of the rear wall extending beyond the forwardly extending part of the channel wall supporting a rear edge of a pack of filter medium mounted in the frame.

To advantage, said channel wall is distanced from an outer wall of the profiled element and the rearwardly extended part thereof together with a front wall and part of the outer wall forms a front groove for accommodating a front end of an angle piece inserted into the profiled element, a corresponding rear groove for accommodating the rear end of an angle piece being formed by a part of the outer wall and a forwardly extended wall projecting from a rear wall of the profiled element. Each angle piece has L-shape, the width of the legs of the L-shaped angle piece being dimensioned so that the front end of these legs fit into the front groove and the rear end of these legs fit into the rear groove.

Furthermore, each leg of each L-shaped angle piece is provided with a depression into which an indentation in the forwardly extending wall projecting from the rear wall of the profiled element and an indentation in said channel wall extend. The indentations can thus be made by a tool acting in a direction perpendicular to the forwardly extending wall, such a tool being simple to control by a machine.

Advantageously, each profile element includes an outwardly directed open gasket channel extending along the profiled element in the front and rear ends thereof. Preferably, each outwardly directed frontal gasket channel is formed by a front wall projecting inwardly from the outer wall of the profiled element at a distance from the front end of the outer wall of the profiled element and a forwardly directed wall projecting from the front wall, and each outwardly directed rear gasket channel is formed by a rear wall projecting inwardly from the outer wall of the profiled element at a distance from the rear end of the outer wall of the profiled element and a rearwardly directed wall projecting from the rear wall, spacer elements having a thickness smaller than the outer wall extending forwardly from the front end of the outer wall and rearwardly from the rear end of the outer wall. Such a construction enables a sealant filling the gasket channel to expand outwardly in a symmetrical fashion.

BRIEF DESCRIPTION OF THE DRAWINGS

The invention will now be described with reference to the enclosed figures, of which;

FIG. 1 schematically shows a cross-sectional view of a profiled element included in a frame according to a preferred embodiment of the invention, FIG. 2 schematically shows a perspective view of an angle piece of a frame according to a first preferred embodiment, FIG. 3 schematically shows a corner of a frame according to a preferred embodiment in a perspective view from the inside, FIG. 4 schematically shows a cross-sectional view of a frame according to a preferred embodiment with a filter pack mounted therein, FIGS. 5 and 6 schematically show a cross-sectional view of the frame according to FIG. 4 provided with an outer gasket in a not mounted state and in a mounted state, respectively, and FIG. 7 schematically shows a perspective view of an angle piece of a frame according to a second preferred embodiment.

DESCRIPTION OF EMBODIMENTS

Figure 4:
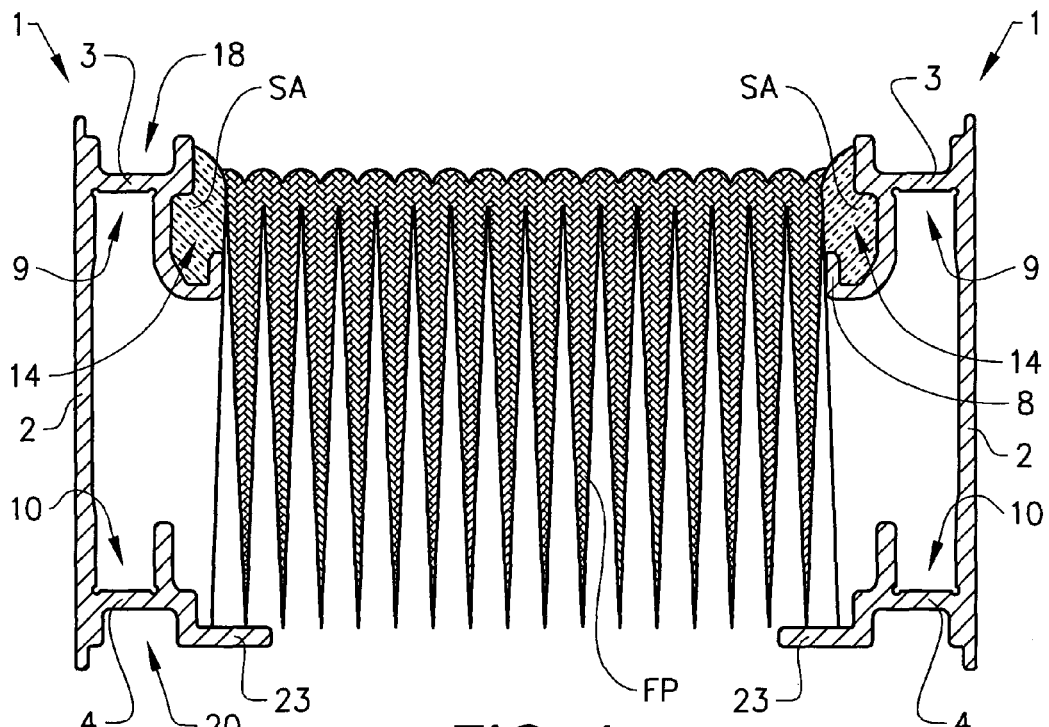

A frame according to the present invention is constituted by four elongate profiled elements having the same cross-section, said elements being held together by angle pieces in the assembled state of the frame. In FIG. 1, an elongate profile element 1 is shown in a cross-sectional view. Element 1 includes an outer wall 2, a front wall 3 and a rear wall 4, the front and rear walls 3,4 extending perpendicular to the outer wall in an inward direction. By an "inward direction" is meant a direction from the outer wall 2 of a profiled element towards the opening surrounded by the four elongate profiled elements, which is formed when the frame is assembled. The four elongate elements making up the frame can all have the same length or can have different lengths in pairs. The front of the frame is defined as being present on the inlet side of a filter pack mounted in the frame.

Connected to the front wall 3 is a channel wall 5 which includes a rearwardly extended part 6, followed by an inwardly extended part 7 in turn followed by a forwardly extending part 8, the forwardly extending part 8 having a smaller dimension than the rearwardly extending part 6.

The rearwardly extended part 6 forms together with the front wall 3 and a front part of the outer wall 2 a front groove 9 in the front region of element 1. A rear groove 10 is formed by a rear part of the outer wall 2, the rear wall 4 and a forwardly directed wall 11 projecting from the rear wall 4.

In the assembled state of the frame a front end portion and a rear end portion of angle pieces 12 are accommodated in the respective groove 9,10 as is shown in FIG. 3.

An angle piece 12 is shown in FIG. 2. The angle piece 12 has in cross-section the general shape of a L. In each leg of the L-shaped angle piece 12, a depression 13 is made which extends over the whole width of the leg, i.e. from the rear end 25 of the leg to its front end 26.

The frame is assembled by inserting one leg of an angle piece 12 into each pair of opposite grooves 9,10 in opposite lateral ends of a first profiled element 1 and thereafter threading lateral ends of second and third profile elements 1 onto the remaining legs of the angle pieces. There after the remaining legs of angle pieces inserted into the grooves 9, 10 of a fourth profile element 1 are inserted into the grooves 9, 10 in the free ends of the second and third profile elements. In FIG. 3, a corner portion of an assembled frame is schematically shown. As is evident from this figure, indentations 27 in the walls 11 and the channel walls 5 of the left and right profile element 1 shown lock the profile elements together by preventing relative movement in a lateral direction between a profile element and the co-operating leg of an angle piece. Since relative movement in any other direction is prevented by the grooves 9, 10 a very stable frame is obtained.

The indentations are preferably made by a machine tool, for example a machine tool having a shaping plate movable in a plane perpendicular to walls 11,5 and in a diagonal direction relative to the frame, as is schematically by plate T in FIG. 3. The indentations are located so that they co-operate with the depressions 13 in the respective angle piece 12. By such a construction a relatively small force is need to make the indentations in the walls 11,5.

In FIG. 4, an assembled filter frame in which a filter pack FP has been mounted is schematically shown in a cross-sectional view. In the front of the filter pack FP, the lateral sides thereof are in abutment against the forwardly directed parts 8 of the channel walls 5 of the four profile elements 1 making up the frame. The rear end portion of the filter pack FP rests on a part 23 of the rear walls 4 of the profiled elements. A sealing adhesive SA fills the channel 14 formed by the channel walls 5 of the profile elements. The opposite lateral sides of the filter pack containing the opposite edges of the pleated filter medium is sealed by a strip of plastic so it is enough to peripherally sealingly connect the front part of the filter pack to the frame to ensure that all air entering the filter pack will pass through the filter medium in the filter pack. The sealing adhesive is preferably a polyurethane adhesive which will expand in the channel 14 and press against the front part of the filter pack and the channel walls of the frame. By providing the channel walls with the forwardly directed wall parts 8 it is ensured that no adhesive will expand downwardly during the expansion phase. Furthermore, the construction of the channel 5 with the adhesive SA disposed between a forward wall part 8 and a rearward part 6 ensures that the risk for air leakage due to shrinkage of the expanded adhesives SA is eliminated or at least reduced to a minimum.

By the inventive frame a significant amount of adhesive is saved compared to known frames where the sealing channel reach over the whole thickness of the filter pack, i.e. from its rear side to its front side. Moreover, it is very easy to fill the channel 14 from above which makes the mounting of the filter pack in the frame very easy.

Figure 5:
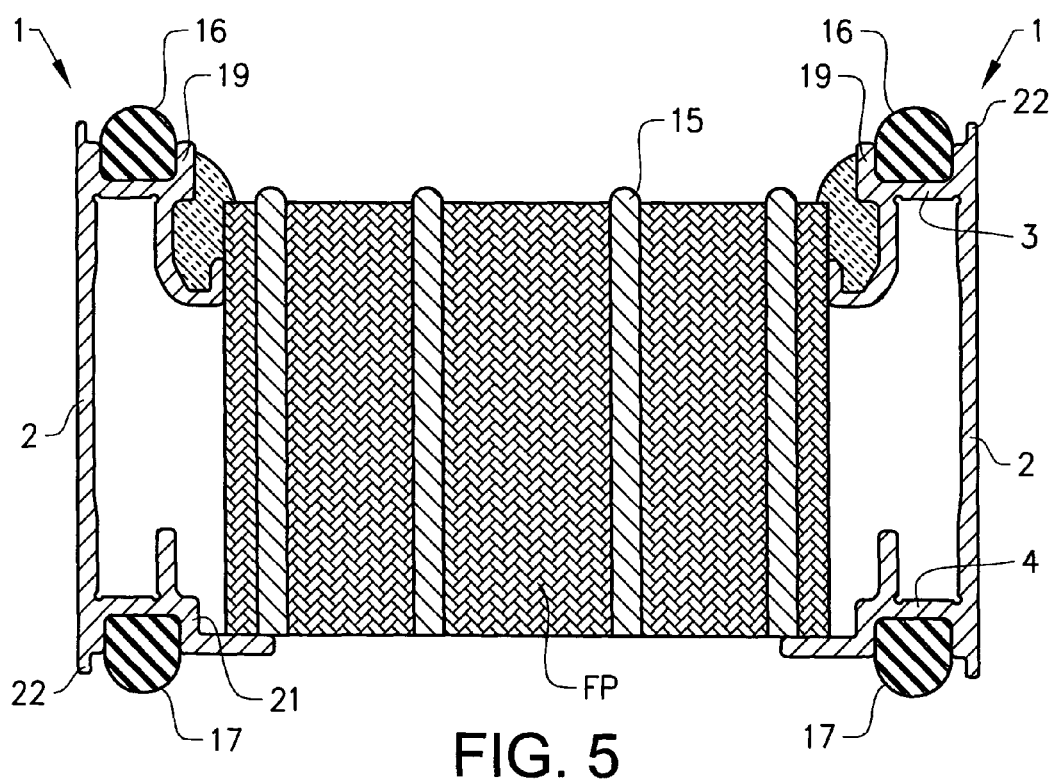
Figure 6:
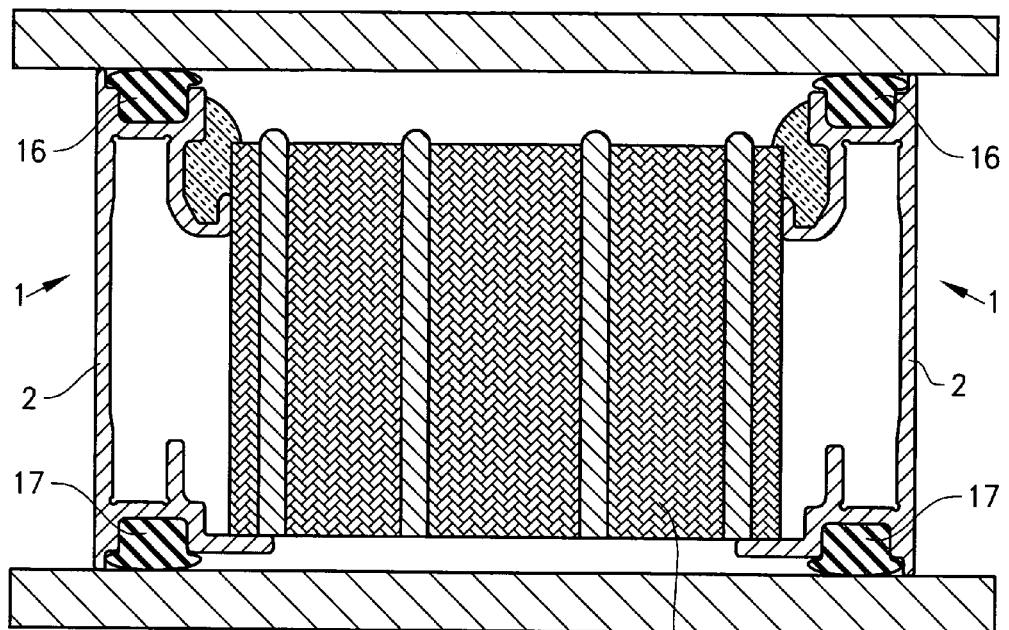

In FIGS. 5 and 6, a cross-sectional view of a filter frame with a filter pack FP mounted therein is schematically shown. As can be seen in these figures the pleats in the filter medium are spaced from each other by spacers 15, preferably in the form of glue strings. Furthermore, an outer gasket 16, preferably in the form of a string of polyurethane foam, is disposed in a peripheral channel 18 on the front of the frame. Channel 18 is formed of a part of the outer wall 2, the front wall 3 and a wall 19 projecting forwardly from the front wall 3, of the four profiled elements 1. Wall 19 forms also a part of the channel 14 and prevent the sealing adhesive therein from entering channel 18. A similar channel 20 is formed in the rear of the frame by a part of the outer wall 2, a first part of the rear wall 4, and a rearwardly directed part 21 of the rear wall 4.

In FIG. 5 the filter, i.e. the filter frame with a filter pack mounted therein, is shown before mounting. FIG. 6 shows schematically the filter in a mounted state with compressed gaskets 16,17. The front end and rear end of the outer walls 2 of the four profile elements 1 have spacer elements 22 projecting outwardly from the ends of the outer walls 2. These spacer elements 22 are thinner that the outer walls thereby allowing an expansion of the gaskets in a lateral direction during compression thereof. Furthermore, these spacer elements prevent the gaskets from being compressed to such extent that the elasticity of the polyurethane gaskets is reduced. In the preferred embodiment these spacer elements 22 form a thin walls extended along the whole of the outer wall.

The gaskets 16,17 are manufactured by filling channels 18,20 with a foam material which then is allowed to swell. The fact that the spacer elements 22 are distanced from channels 18 and 20 results in that the foam material will not be in contact with any lateral wall during swelling, whereby a symmetrical swelling of the foam material is obtained.

The profile elements 1 and the angle pieces 12 are preferably made of aluminium.

Figure 7:
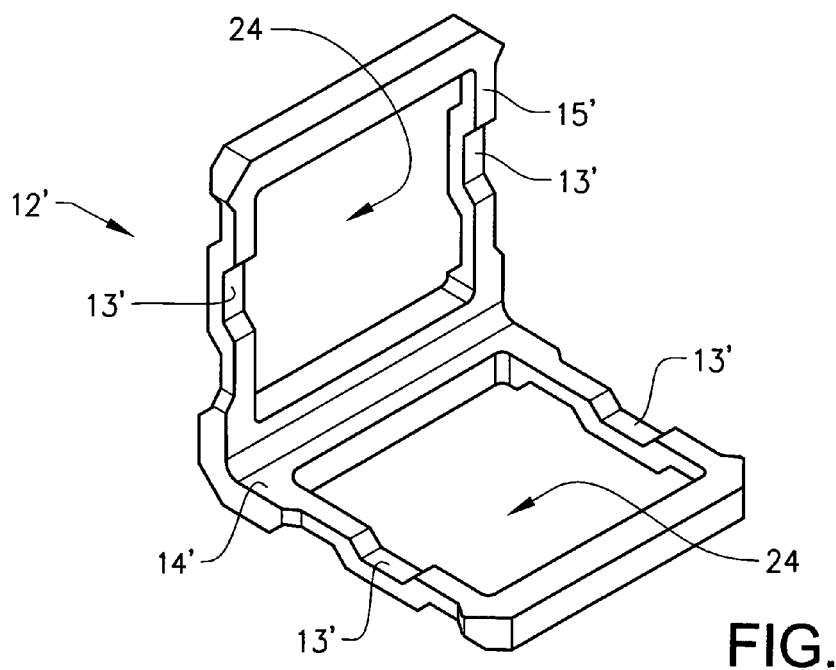

In FIG. 7, an angle piece 12' according to a second preferred embodiment is shown. This angle piece differs from the angle piece 12 shown in FIG. 2 by having openings 24 in the middle region of the parts of angle piece 12' corresponding to the leg parts of the L-shaped angle piece 12. The depressions 13' do thus only have a limited extension in the front and rear parts of the angle piece 12'. Such an angle piece 12' is preferably made by moulding plastic or reinforced plastic.

The described embodiment can be modified in several ways without leaving the scope of invention. For example, the spacer elements need not be a wall but can be two or more discrete elements projecting from the ends of the outer walls of the filter frame. Furthermore, other adhesives or sealants than polyurethane adhesive, such as silicone adhesive, hot melt adhesive, etc., can be used for sealing the filter pack to the frame. Other foams or sealants than polyurethane foam can also be used as gaskets for sealing the frame to a wall or the like. It is also possible to make the angle pieces without depressions and let the machine tool make indentations in the angle pieces at the same time as in the forwardly directed walls in the rear of the profile elements. The invention shall therefore only be limited by the contents of the enclosed patent claims.

The invention claimed is:

1. An air filter frame constituted of four profiled elements being held together by angle pieces and surrounding an opening therebetween, in which a pack of pleated filter medium is intended to be mounted, said profiled elements having a front side, which when a pack of filter medium is mounted in the frame is adjacent to an inlet side thereof, and a rear side, which when a pack of filter medium is mounted in the frame is adjacent to an outlet side thereof, wherein an inwardly open sealing channel extends along each profiled elements in the front end thereof wherein said sealing channel is defined by a channel wall including a rearwardly extended part followed by an inwardly extended part in turn followed by a forwardly extending part, the forwardly extending part having a smaller dimension than the rearwardly extending part, and wherein a rear wall of each profiled element extends inwardly from an outer wall of the profiled element and is extended beyond the forwardly extending part of the channel wall in an inward direction, the portion of the rear wall extending beyond the forwardly extending part of the channel wall supporting a rear edge of a pack of filter medium mounted in the frame.

2. The filter frame according to claim 1, wherein said channel wall is distanced from an outer wall of the profiled element and the rearwardly extended part thereof together with a front wall and part of the outer wall form a front groove for accommodating a front end of an angle piece inserted into the profiled element, a corresponding rear groove for accommodating the rear end of an angle piece being formed by a part of the outer wall and a forwardly extended wall projecting from a rear wall of the profiled element.

3. The filter frame according to claim 2, wherein each angle piece has L-shape, the width of the legs of the L-shaped angle piece being dimensioned so that the front end of these legs fit into the front groove and the rear end of these legs fit into the rear groove.

4. The filter frame according to claim 3, wherein each leg of each L-shaped angle piece is provided with a depression into which an indentation in the forwardly extending wall projecting from the rear wall of the profiled element extends.

5. The filter frame according to claim 1, wherein each profile element includes an outwardly directed open gasket channel extending along the profiled element in the front and rear ends thereof.

6. The filter frame according to claim 5, wherein each outwardly directed frontal gasket channel is formed by a front wall projecting inwardly from the outer wall of the profiled element at a distance from the front end of the outer wall of the profiled element and a forwardly directed wall projecting from the front wall, and each outwardly directed rear gasket channel is formed by a rear wall projecting inwardly from the outer wall of the profiled element at a distance from the rear end of the outer wall of the profiled element and a rearwardly directed wall projecting from the rear wall, spacer elements having a thickness smaller than the outer wall extending forwardly from the front end of the outer wall and rearwardly from the rear end of the outer wall.

7. The filter frame according to claim 1, wherein the profile elements and the angle pieces are made of aluminium.

8. The filter frame according to claim 1, wherein the angle pieces are made of plastic or reinforced plastic.

* * * * *